Jan. 7, 1964     A. P. DIJKSMAN     3,116,814

HYDRAULIC SHOCK ABSORBER

Filed Feb. 24, 1961

United States Patent Office 3,116,814
Patented Jan. 7, 1964

3,116,814
HYDRAULIC SHOCK ABSORBER
Albertus Philippus Dijksman, Rotterdam, Netherlands, assignor to Janson Fabrieken N.V., Rotterdam, Netherlands, a corporation of Netherlands
Filed Feb. 24, 1961, Ser. No. 91,445
Claims priority, application Netherlands Feb. 27, 1960
3 Claims. (Cl. 188—100)

This invention relates to a hydraulic shock absorber in which a piston rod is guided through a central axial bore of a cylinder cover and the cover is provided with a bore for de-aeration, the bore opening at one end into the axial bore.

Such a shock absorber is known from the United States Patent 2,138,513, Rossman et al. According to this prior art patent specification the bore for the de-aeration opens at the other end into the cylinder chamber below the cover and is there provided with a non-return valve.

This shock absorber must be mounted in such inclined position or horizontally that the bore is positioned as high as possible, which in some cases requires special provisions with respect to the fastening means for the shock absorber. In consequence of the fact that the non-return valve is mounted in the bore this bore does not end directly at the inner wall of the cylinder and there is the possibility that with the most favorable arrangement still a small amount of air remains in the cylinder chamber. Also, a non-return valve does not operate noiselessly and this is particularly undesirable in shock absorbers.

It has already been proposed to avoid the above-mentioned disadvantages by providing a number of conduits in the cover which conduits open at one end into the axial bore of the cover and at the other end into the cylinder chamber in close proximity to the junction of the cover to the cylinder mantle. It is preferred to provide the conduits in an extension of the cover projecting into the cylinder chamber, this extension having a smaller outer diameter than the cover. The conduits then open into an annular space around the extension.

A disadvantage of this shock absorber consists in that there is the possibility that at an inclined position of the shock absorber the highest point where the air is located lies exactly between two conduits and that therefore still a small amount of air stays behind with all the disadvantages involved.

The invention provides a shock absorber in which the cover has also only one bore and yet all of the air is entirely sucked off at any position of the shock absorber.

The hydraulic shock absorber according to the invention is characterized in that the bore for de-aeration opens at the other end into an annular groove, said groove forming an enlargement of the clearance between the cover and the inner wall of the working cylinder.

It is preferred to provide the annular groove near the junction of the cover to the upper end of the cylinder mantle.

It is particularly preferable if the bore for de-aeration opens at the other end into an annular groove provided in the inner wall of the working cylinder between the upper end of said cylinder and the lowermost end of the cover. In this way it is prevented that the bore might be closed by the piston rod as a result of a transversely acting force.

According to the invention the annular groove may be provided in the outer periphery of the cover between the upper end of the working cylinder and the lowermost end of the cover or in the inner wall of the working cylinder between the upper end of that cylinder and the lowermost end of the cover.

Since for reasons of manufacturing technique the cover in the cylinder mantle always fits in the cylinder with some clearance in the order of some tenths of a mm., it will always be possible for the air to reach the groove in the outer periphery of the cover. However, some resistance will always be exercised against oil being sucked in. Also, if one end of the bore is filled with oil, this oil will be sucked away and subsequently the air will be sucked from the annular groove before additional oil may penetrate into the groove. Therefore, in any operative position of the shock absorber according to the invention the air will be entirely sucked off.

By using only one bore one may suck the air to the axial bore with less pressure difference than in the case of more bores being provided.

The invention is elucidated below with reference to the accompanying drawings showing by way of example two embodiments of the shock absorber according to the invention and in which only those parts of the shock absorber have been indicated which are necessary for clearly understanding the invention.

FIG. 3 is a longitudinal section similar to FIG. 1 illustrating a second embodiment of a shock absorber according to the invention.

Figure 1:
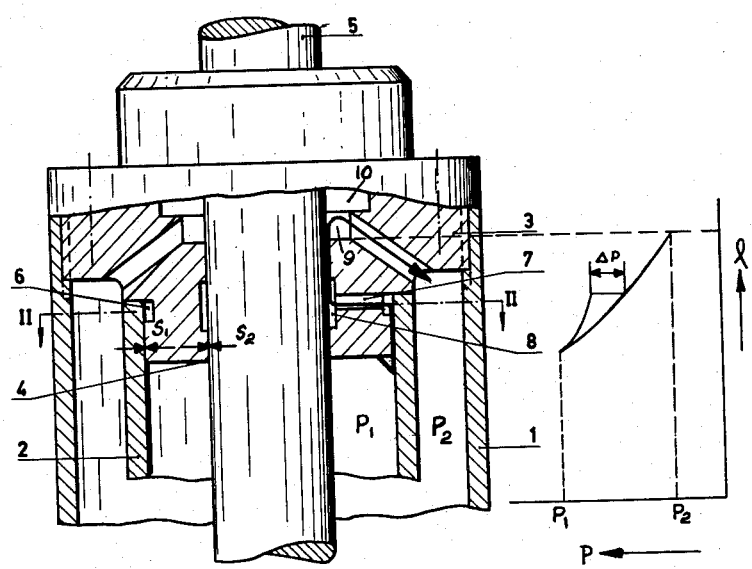
FIG. 1 is a longitudinal section with a partial side view of the upper end of the shock absorber according to the invention.
Figure 2:
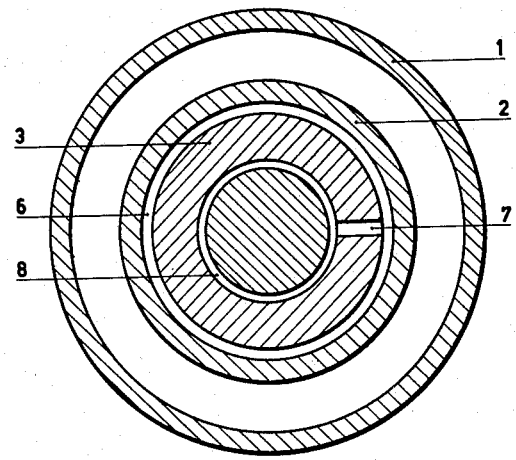
FIG. 2 is a cross-section according to the line II—II of FIG. 1.

In the figures reference numeral 1 denotes the outer cylinder and reference numeral 2 the working cylinder, the unit being closed by a cover 3 fixed in the outer cylinder 1 by means of a screw thread and the necessary packing being provided for the purpose of sealing.

The cover 3 is provided with a bore 4 through which the piston rod 5 of the shock absorber is guided.

In the outer periphery of the cover 3 there is provided near the junction to the cylinder 2 a groove 6 extending along the entire periphery. From this groove a bore 7 extends through the cover to an annular groove 8 provided at the inner periphery of the cover 3.

In the absence of the groove 8 the possibility would exist that as a result of a transversely acting force the rod 5 might be pressed towards the side of the outlet of the bore 7 and could close the said outlet. Thanks to the provision of the groove 8 there is always an unimpeded passage for oil and air to the space between the piston rod 5 and the axial bore 4.

The cover 3 is also provided with a recess 9 near the upper end. This recess is adapted to receive a packing 10 which fits snugly around the piston rod 5. Air entering the groove 8 through the bore 7 passes along the piston rod 5 into the recess 9 and travels from there into the outer cylinder.

Referring now more particularly to FIG. 3 of the drawings, the groove 6 may also be provided in the inner periphery of the cylinder 2 and in that case the bore 7 extends up to the periphery of the cover 3.

I claim:
1. A hydraulic shock absorber having two spaced concentric tubular members defining an intermediate chamber, the inner concentric member providing a working cylinder, a cover for said tubular members having an axial bore and an outer wall, said cover having passage means for connecting said axial bore with said intermediate chamber, a piston rod extending from said working cylinder cover outwardly through said axial bore, an annular groove spaced from the inner end of said cover and located adjacent the end of said inner tubular member and located adjacent said cover in the inner portion of said outer wall and including an enlarged clearance between a portion of the inner wall of the working cylinder and a portion of the adjacent outer wall of said cover, and a single radial bore in said cover for connecting said annular groove to said axial bore for de-aerating the space within said working cylinder, through said passage means into said intermediate chamber, wherein the clearance between a portion of said cover and a portion of the inner wall of said working cylinder being substantially larger than the clearance between said piston rod and at least a portion of the central axial bore of said cylinder cover.

2. A device as in claim 1 wherein said annular groove is located in the inner portion of the wall of said inner tubular member.

3. A device as in claim 1 wherein said annular groove is located to include a portion of the outer wall of said cover and a portion of the inner wall of said inner tubular member.

References Cited in the file of this patent

UNITED STATES PATENTS

| | | |
|---|---|---|
| Re. 21,908 | Beecher | Sept. 30, 1941 |
| 1,966,310 | Padgett | July 10, 1934 |
| 2,060,590 | Padgett | Nov. 10, 1936 |
| 2,117,837 | Casper | May 17, 1938 |
| 2,138,513 | Rossman et al. | Nov. 29, 1938 |
| 2,673,731 | Patriguin | Mar. 30, 1954 |
| 2,780,321 | Sturari | Feb. 5, 1957 |

FOREIGN PATENTS

| | | |
|---|---|---|
| 1,126,815 | France | July 30, 1956 |